C. A. T. SÖRENSEN.
JOURNALING DEVICE FOR SHAFTS AND OTHER PARTS.
APPLICATION FILED MAR. 24, 1915.
1,156,188.
Patented Oct. 12, 1915.
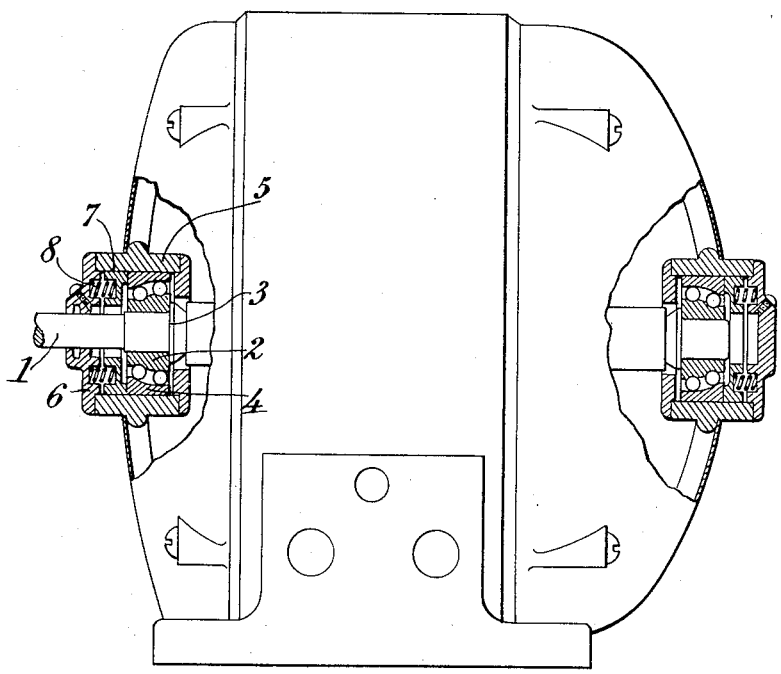

UNITED STATES PATENT OFFICE.

CARL AUGUST THEODOR SÖRENSEN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

JOURNALING DEVICE FOR SHAFTS AND OTHER PARTS.

1,156,188.     Specification of Letters Patent.     Patented Oct. 12, 1915.

Application filed March 24, 1915. Serial No. 16,575.

*To all whom it may concern:*

Be it known that I, CARL AUGUST THEODOR SÖRENSEN, a citizen of the Kingdom of Sweden, residing at Gottenborg, Sweden, have invented new and useful Improvements in Journaling Devices for Shafts and other Parts, of which the following is a specification.

The present invention relates to improvements in journaling devices for shafts and other parts of a type in which ball bearings adapted to sustain end thrusts caused by one or more springs or the like acting upon the bearing are used.

The object of the invention is to provide a journaling device of this kind, which is capable of sustaining reliably the radial load, at the same time allowing, to a certain extent, longitudinal movements of the shaft or other part supported by the bearing, without interfering with its normal operation.

With this object in view the invention consists, chiefly, in that the ball bearing is provided with a set of balls sustaining substantially the end thrusts caused by the pressure of the spring or springs, and another set of balls sustaining substantially the radial load.

In the accompanying drawing is illustrated, partially in section, a dynamo, the rotor of which is journaled according to my present invention.

Referring to the drawing, 1 denotes the shaft of the dynamo supported by two ball bearings capable of sustaining both radial and end thrusts, said bearings being *per se* of well known construction and provided with two sets of balls and a spherical outer ball-track.

The inner track-ring 2 of each bearing is either rigidly secured to the shaft 1 or, as is shown on the drawing, attached to the same in such manner that the track-ring bears against a shoulder 3 or a flange or the like on the shaft. The outer track-ring 4 is movable in longitudinal direction relatively to the casing of the bearing. Placed between the outer end wall or cover 6 of the said casing and the outer track-ring 4 is a ring or washer 7, which is likewise movable in the casing of the bearing. Springs 8 tending to move the ring 7 away from the cover 6 are disposed in recesses formed in the ring 7 and in the cover 6. To prevent the ring 7 from being turned relatively to the cover 6 and to obviate noxious stresses of the springs 8 caused thereby, there may be placed between the ring 7 and the cover 6 or between the ring 7 and the casing 5 stopping devices of some suitable kind not shown on the drawing.

By the arrangement described above, which may be applied to one end of the shaft or to both ends thereof, the outer track-ring 4 will always be pressed toward the balls with a certain pressure independent of slight axial movements of the shaft caused, for instance, by changes of temperature, by axial vibrating of the shaft, as in dynamos in which the armature always tends to adjust itself to the varying magnetic field, or by the wear of the balls and the ball-tracks.

The device described may be modified in several respects without deviating from the principles of the invention. Thus, for instance, the ring 7 may be omitted, and the springs be brought to act directly on the outer track-ring 4. The ball bearings used may be unsymmetrical bearings having a spherical outer ball-track, or be of a type in which the outer ball-track consists of an oblique spherical or otherwise formed portion and a cylindrical portion.

Having thus described my invention, what I claim as new and desire to secure by Letters Patent is:

1. The combination with a ball set for supporting radial load and a ball set for receiving axial thrust of spring means for applying load to the thrust receiving set only.

2. The combination with a ball set for supporting radial load and a ball set for receiving axial thrust of a spring, and means for communicating the pressure of the spring to the axial thrust receiving set and applying load thereto, the radial load supporting set being free of such spring applied load.

3. In a ball bearing, the combination with a ball set for supporting radial load, and a ball set for receiving axial thrust of a spring, and means for communicating the pressure of the spring to the said bearing for applying load to the thrust receiving set, the radial load supporting set being free of such spring applied load.

4. The combination with a shaft of a pair of ball bearings carrying the same, said ball bearings comprising sets for supporting radial load and sets for receiving the axial thrust in opposite directions, a pair of springs, and means for communicating the pressure of the springs to the respective axial thrust receiving sets and applying load thereto, the radial load supporting sets being free of such spring applied load.

In testimony whereof I have hereunto set my hand in presence of two subscribing witnesses.

CARL AUGUST THEODOR SÖRENSEN.

Witnesses:
JOHN DELMAR,
K. E. WIBERG.